United States Patent [19]

Suzuki et al.

[11] 4,211,823

[45] Jul. 8, 1980

[54] TINTABLE COATINGS AND ARTICLES HAVING SUCH COATINGS

[75] Inventors: Masaharu Suzuki, Takatsuki; Takashi Taniguchi, Shiga; Hideki Yamagishi, Otsu, all of Japan

[73] Assignee: Toray Industries, Inc., Tokyo, Japan

[21] Appl. No.: 38,205

[22] Filed: May 11, 1979

Related U.S. Application Data

[63] Continuation-in-part of Ser. No. 884,273, Mar. 7, 1978, abandoned.

[30] Foreign Application Priority Data

Nov. 3, 1977 [JP] Japan ................................. 52/26109

[51] Int. Cl.$^2$ ..................... C08L 83/04; B32B 27/08; B32B 27/30; B32B 27/28
[52] U.S. Cl. ............................. 428/412; 260/29.2 M; 260/375 B; 427/164; 428/413; 428/447
[58] Field of Search ................. 260/29.2 M, 375 B; 428/412, 447, 413; 427/164

[56] References Cited

U.S. PATENT DOCUMENTS

| | | | |
|---|---|---|---|
| 2,645,629 | 7/1953 | Nitzsche | 260/46.5 |
| 3,971,747 | 7/1976 | Bank et al. | 260/46.5 E |
| 3,986,997 | 10/1976 | Clark | 260/29.2 M |
| 4,006,271 | 2/1977 | French et al. | 428/412 |
| 4,026,826 | 5/1977 | Yoshida et al. | 260/2 S |
| 4,027,073 | 5/1977 | Clark | 260/29.2 M |
| 4,049,867 | 9/1977 | Ito et al. | 428/412 |
| 4,082,719 | 4/1978 | Liles et al. | 260/375 B |

*Primary Examiner*—James R. Hoffman
*Attorney, Agent, or Firm*—Miller & Prestia

[57] ABSTRACT

A tintable coating composition is provided. It includes (A)(1) hydrolysates of silane compounds containing at least one epoxy group and not less than two alkoxy groups which are directly bonded to Si atom in the molecule, and, if necessary, (2) compounds containing silanol and/or siloxane groups in the molecule, and/or epoxy compounds; (B) fine silica particles having an average diameter of from about 1 to about 100 m$\mu$; and (C) an aluminum chelate compound having the general formula $AlX_nY_{3-n}$, where X is OL (and L represents a lower alkyl group), Y represents one or more ligands produced from a compound selected from the group consisting of $M^1COCH_2COM^2$ and $M^3COCH_2COOM^4$ where all of $M^1$, $M^2$, $M^3$ and $M^4$ are lower alkyl groups, and wherein n is an integer comprising 0, 1 or 2.

This invention also concerns an article, preferably plastic, coated with said coating composition and having a hard and tintable, scratch-resistant film, which is formed by heating and curing.

19 Claims, No Drawings

TINTABLE COATINGS AND ARTICLES HAVING SUCH COATINGS

This is a continuation-in-part of application Ser. No. 884,273, filed Mar. 7, 1978, now abandoned.

BACKGROUND OF THE INVENTION

The present invention relates to coating compositions and articles coated therewith. The coating composition is excellent in scratch resistance, flexibility, antistatic properties and dyeability.

Articles made with plastic materials are popular, since they are easily formed and light, but some of the substantial defects of the materials are their poor scratch resistance and low hardness. Although plastics are finding wide uses in areas where transparent qualities are necessary, they are not without problems. Plastic lenses, for example, have become increasingly popular. However, they are easily to scratch when compared with conventional glass lenses. Scratch resistant coatings have often been suggested. Various silicone resin compositions have been suggested. Among these silicone resins are hydrolysates of silane compounds, such as tetraalkoxysilanes, and trialkoxyalkylsilanes, regardless whether reactive groups are present in the alkyl groups or not.

Other improved coatings contain fine particles of silica and silicon compounds. These coatings exhibit improved scratch resistance.

It is highly desirable that plastics acquire certain properties which cannot be obtained with conventional glass products. These properties include flexibility and dyeability, for example, as well as scratch resistance. Accordingly, plastic materials exhibiting enhanced flexibility, dyeability and scratch resistance can replace glass in many cases. many coating films, up to now, have lacked in flexibility and have heretofore cracked when they have been heated or distorted.

Heretofore, it has been practically impossible to tint or dye coating films that have scratch resistance.

It is an object of the present invention to solve these problems, and to create coating compositions that provide transparent, hard films with high flexibility and tintability.

DETAILED DESCRIPTION OF THE INVENTION

The coating composition of the present invention comprises mainly three components A, B and C, as identified hereinafter.

Component A comprises (1) hydrolysates of silane compounds containing an epoxy group and not less than two alkoxyl groups which are directly bonded to Si atom in the molecule; the following compounds (2) (2.1) can be added: (2) compounds containing a silanol and/or siloxane group in the molecule; and/or (3) epoxy compounds.

Component B comprises fine particles of silica having an average diameter of about 1 to about 100 m$\mu$.

Component C comprises aluminum chelate compounds having the formula $AlX_nY_{3-n}$ wherein X is OL (and L is a lower alkyl group), Y is at least one ligand produced from the following compounds: $M^1COCH_2COM^2$ and/or $M^3COCH_2COOM^4$, wherein $M^1$, $M^2$, $M^3$ and $M^4$ are lower alkyl groups and n is 0, 1 or 2.

The compounds (1) in component A are preferably hydrolysates of the compounds of the formula:

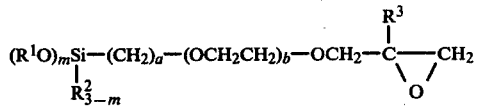

wherein $R^1$ is an alkyl or alkoxy alkyl group having 1 to 4 carbon atoms; $R^2$ is an alkyl or aryl group having 1 to 6 carbon atoms; $R^3$ is hydrogen or methyl group; m is 2 or 3; a is an integer from 1 to 6; and b is 0, 1 or 2. These compounds include γ-glycidoxypropyltrimethoxysilane, γ-glycidoxypropyltriethoxysilane, γ-glycidoxypropylmethyldimethoxysilane, γ-glycidoxypropylmethyldiethoxysilane and γ-glycidoxyethoxypropylmethyldimethoxysilane.

The compounds (2.1) in component A are, preferably, hydrolysates of compounds shown in the following formula:

wherein $R^4$ and $R^5$ are moieties selected from the group consisting of substituted or non-substituted alkyl, alkenyl and aryl (examples of substituted alkyl are halogenated alkyl and methacryloxyalkyl); Z is an alkoxyl, alkoxyalkoxyl or acyloxy group; c and d are 0 or 2, respectively; and c+d is 0, 1 or 2. These compounds include (1) tetraalkoxysilanes, such as methylsilicate, ethylsilicate, n-propylsilicate, isopropylsilicate, n-butylsilicate, sec-butylsilicate, and t-butylsilicate, and/or (2) trialkoxysilanes, trialkoxyalkoxylsilanes or triacyloxysilanes, such as methyltrimethoxysilane, methyltriethoxysilane, vinyltrimethoxysilane, vinyltriethoxysilane, vinyltrimethoxyethoxysilane, vinyltriacetoxysilane, phenyltrimethoxysilane, phenyltriethoxysilane, γ-chloropropyl-trimethoxysilane, γ-trifluoropropyltrimethoxysilane, methacryloxypropyltrimethoxysilane, and β-(3,4-epoxycyclohexyl)ethyltrimethoxysilane, and/or (3) dialkoxysilanes, such as: dimethyldimethoxysilane, γ-chloropropylmethyldimethoxysilane and methylphenyldimethoxysilane. Hydrolysates of tetraalkoxysilane and trialkoxysilane, or mixtures thereof, are preferably used, but it is also possible to use hydrolysates or dialkoxysilanes in some cases.

The silane hydrolysate compounds, identified above, are prepared by adding pure water or diluted aqueous hydrochloric or sulfuric acid to the silane. It is possible, too, that hydrolysis is carried out without adding solvent by using only alcohol or carboxylic acid formed in the reaction of water and the silane compounds. It is also possible that solvents, which are produced in hydrolysis (such as alcohol and/or carboxylic acid), are substituted with other solvents. Various solvents such as: alcohol, ketone, halogenated hydrocarbon, aromatic hydrocarbon, and mixtures thereof, are acceptable.

The compounds (2.2) of component A are epoxy compounds which are popular in coating or moulding. These epoxy compounds preferably have not less than two epoxy groups in the molecule. Preferably, these compounds include a polyglycidyl ether or polyglycidyl ester. The polyglycidyl ether compound may be synthesized by the reaction of epichlorohydrin with: (1) a polyfunctional phenol having a molecular weight of less than 1,000, such as 2,2-di(p-hydroxyphenyl) propane (bisphenol-A), di(p-hydroxyphenyl)methane (bisphenol-F) or 2,2-di(p-hydroxypopoxyphenyl)propane (of these compounds bisphenol-A and bisphenol-F are preferable, and the most preferable is bisphenol-A), or (2) a polyfunctional aliphatic or alicyclic alcohol having not more than 15 carbon atoms, such as (poly)ethylene glycol, (poly)propylene glycol, neopentylglycol, trimethylolethane, trimethylolpropane, pentaerithritol, diglycerol, sorbitol, 1,4-dihydroxymethylcyclohexane, or 2,2-di(4-hydroxycyclohexyl)propane.

The polyglycidyl ester may be synthesized by the reaction of epichlorohydrin with polyfunctional aliphatic or alicyclic carboxylic acids having not more than 8 carbon atoms such as, succinic acid, glutaric acid, adipic acid, tetrahydrophthalic acid, hexahydrophthalic acid, or hexahydroterephthalic acid.

The compounds (1) and (2) of component A may be used individually as component A, but it is preferable that mixtures thereof are used. The calculated weight percent of compound (1) in component A in film is more than about 10, and the calculated weight percent of the sum of (1) and (2.2) in component A in film is more than about 30. The calculated weight percent of component A in film is defined as the percentage of calculated weight of the compound (1) or (2) in component A in the film based on the sum of the weights of the compounds (1) and (2). In case of (1) and (2.1) the calculated weight means the weight of the siloxane unit $Q_kSiO_{(4-k)/2}$, wherein Q is an organic substituent bonded with Si, by C—Si bonding and $Q_kSiO_{(4-k)/2}$ is derived from hydrolysates of $Q_kSi(OS)_{4-k}$ wherein S is an alkyl or acyl group, k is 0, 1 or 2, and in case of (2.2) it means the net weight of compound (2.2).

When the calculated weight percent of compound (1) of component A in film is less than 10, it is impossible for the coating and cured film to exhibit sufficient scratch resistance and sufficient dyeability at the same time. When the calculated weight percent of the sum of compounds (1) and (2.2) of component A in the film is less than 30, the coating and cured film does not show sufficient dyeability.

As for the B component in this invention, that is, the fine particles of silica having about 1 to about 100 mμ average diameter, silica sol is one effective example. The silica sol is a colloidal dispersion of high molecular weight silicic anhydride in water and/or alcoholic solvent, and is readily available commercially. For the purpose of this invention, a weakly acidic dispersion of silica having a diameter of about 5 to about 30 mμ is especially useful.

In place of silica, hydrolysates of alkyl orthosilicates may be used to improve the hardness of the coating, but they have poor adhesion to substrates, and are poor with respect to tintability. Tinting of films comprising hydrolysates of alkyl orthosilicates is almost impossible, as will be illustrated in the comparative examples reported hereinafter.

The B component is essential, because tintable film coatings have insufficient hardness without it, as will be shown in the comparative examples.

The C component in this invention comprises an aluminum chelate compound having the formula $AlX_nY_{3-n}$ (as defined before). Various compounds are available, but the following compounds are preferable in view of their solubility in compositions, stability, and catalytic activity: aluminum acetylacetonate, aluminum ethylacetoacetate bisacetylacetonate, aluminum bisethylacetoacetate acetylacetonate, aluminum di-n-butoxidemonoethylacetoacetate, aluminum di-i-propoxidemonomethylacetoacetate. Mixtures of these compounds, of course, may also be used.

The D components of the present invention are selected, mixed and used, depending on the method of coating the substrates, or the heating temperature. However, more than about 1 percent by weight, preferably more than about 2 percent by weight of water based upon the weight of the D components is essential to increase stability and suppress partial condensation of the compounds before coating. When less than 1 percent by weight of water is used, due to the reaction between the hydrolysates of the silane compounds, the viscosity of the coating composition steadily increases and it becomes impossible to control the film thickness. Further, due to the reactions between the silane hydrolysates in solution before coating, curing in the film forming stage is imperfect, and the hardness of film remains low. Water in the coating composition may come from imperfect hydrolysis of silane, or condensation between the hydrolysates of silane, or the water may be added in preparing the coating composition.

It is also possible to use various additives. For example, surfactants which both improve the smoothness of the surface by increasing flow of the film during the coating stage, and diminish the frictional coefficient, may be used. Typical example of these additives comprise block or graft copolymers of dimethylsiloxane and alkylene oxide.

Further, other additives include ultraviolet absorbers to improve weather resistance, and antioxidants to improve heat resistance. Coloring materials, such as pigments, dyes and/or fillers may be used also. Other organic polymers may be used to improve coating properties, adhesion, or other physical properties.

Articles advantageously coated in accordance with the invention include acrylic polymers, especially polymethyl methacrylate, poly(2,2-dihydroxyphenyl propane) carbonate, and diethylene glycol bisallyl carbonate polymer; polyesters, especially polyethyleneterephthalate, and; acrylonitrile-styrene copolymers. Besides the plastic articles listed above, inorganic glass, wood and metal are also advantageously coated in accordance with the invention. However, in order to provide the enhanced characteristics of this invention, such as transparency, scratch resistance, flexibility and tintability, plastic materials and most suitable. Plastic articles coated with the composition herein disclosed are used for lenses, such as sunglasses and ophthalmic lenses, watch covers, various types of illumination apparatus, and mirrors.

As for the coating method to be employed, the usual methods, such as dipping, spin coating, roll coating, curtain flow coating, flow coating, and spray coating are acceptable.

The amount of the component B in the present composition is about 1 to 500 parts by weight, preferably about 10 to 200 parts by weight per 100 parts by weight of component A. Lower weight percentages of component B are insufficient to improve hardness. Higher weight percentages than those listed above result in defects such as cracking.

The amount of component C in the coating composition should be about 0.01 to 50, preferably about 0.05 to 10 parts by weight per 100 parts by weight of component A. If less than this amount is used, curing is insufficient. If more than this amount is used, defects result, such as decrease of transparency in certain areas and decrease in adhesion between the coating and the substrate.

Curing of the coating composition in accordance with the invention is carried out by heating, but a wide range of heating conditions may be used, in contrast to the relatively narrow range necessitated by use of other thermosetting resin compositions. Curing within the range of 50° to 250° C. gives good results.

As mentioned above, the coating film or coated articles prepared by applying the composition of the present invention are transparent, excellent in hardness, and exhibit remarkable scratch resistance. The coating film and coated articles are unscratched when rubbed with a hard material, such as steel wool. They solve the problems of ready scratchability of molded plastic compounds. Thus, they may be used to produce high quality articles. The film coat not only exhibits excellent scratch resistance, but also exhibits the following characteristics, which are difficult to obtain in conventional polysiloxane coatings: (1) high tensile strengths and resistance to cracking; (2) low shrinkage and resistance to curl in thin film coating applications; (3) good antistatic properties and resistance against adherence of dust thereto; (4) tintability, especially by dyeing with disperse dyes, thus making it possible to produce materials having a tintable and fashionable hard coat; (5) high surface reflectivity.

The following Examples are illustrative of methods and coated compositions of the invention. Such Examples are not intended to limit the scope of the invention as defined in the appended claims. All references to "parts" and "percent" as used in these Examples are based on weight percent unless otherwise specified.

EXAMPLE 1

Part 1 - Preparation of hydrolysates of γ-glycidoxypropyl methyldiethoxysilane An hydrolysate of γ-glycidoxypropylmethyldiethoxysilane was prepared by placing 248 parts of γ-glycidoxypropylmethyldiethoxysilane into a reactor having a rotor, violently stirring with a magnetic stirrer, and immediately adding 36 parts of 0.05 N hydrochloric acid. At first, the composition was turbid and not homogeneous but became transparent and homogeneous upon stirring for ten minutes. Then the composition was stirred for an additional one hour and allowed to age by setting for one day without stirring. The solid content of the hydrolysate composition was 61.3 percent (residue after heating the composition for 2 hours in an air drying oven at 90° C.).

Part 2 - Preparation of Coating Compositions

The coating composition was prepared by mixing 144 parts of hydrolysates of the first constituent (Component A), 294.2 parts of a colloidal silica dispersion in methanol (Component B-"Methanol Silica Sol", Nissan Chemical Industries, Ltd., having a solid content of about 30%), and 7.9 parts of aluminumacetylacetonate (Component C), and then adding to the mixture 0.04% of silicon surfactant and 5% phenylcellosolve. The coating composition had a solid content of 39% and a viscosity of 4.5 centipoise at 20° C., was stable for one month at 20° C., and showed a one centipoise increase in viscosity. The coating composition had a water content of 5.8% based on the solvent as determined by the Karl Fischer method.

The coating composition as prepared above was applied to a polymethylmethacrylate sunglass lens produced by injection molding of polymethylmethacrylate (Acrypet VH, Mitsubishi Rayon Co., Ltd.) to form an article 75 mm in diameter and 2 mm in thickness. The coated lens was cured for 2 hours in an air drying oven at 90° C.

As compared with uncoated lenses, the coated lens was less susceptible to dust. Additional results of the experiment of this Example are as follows:

(a) Scratch resistance - after rubbing with steel wool #0000, only a trace defect was discovered.

(b) Appearance as spectacle lens - the surface of the lens was excellent in transparency and smoothness.

(c) Adhesion - a tape test was performed and peeling did not occur. The tape test was performed by suddenly peeling adhesive tape off the surface of the lens at a 90° angle.

(d) Hot water resistance - there was no change after dipping into water at 80° C. for one hour.

(e) Tintability - 0.5 parts of disperse dye ("Diacelliton Fast Navy Blue 2B", Mitsubishi Chemical Industries, Co., Ltd.), 0.025 parts of polyoxyethylene nonylphenyl ether and 100 parts of water were used as a dyeing bath. The plastic lens was dipped into the dyeing bath for 15 minutes at 80° C., and was densely colored. The lens was as fast against sunlight, abrasion, sublimation, organic solvents and hot water as the usual lens.

EXAMPLE 2

A coating composition was prepared as in Example 1 and applied to a cast sunglass lens produced from a diethyleneglycolbisallylcarbonate (CR-39) polymer. In this case, the lens should be previously dipped in alkali (about 5–30 weight % of alkaline, such as NaOH or KOH, in water) before the application of the coating composition. The coated lens was cured in an air drying oven for 4 hours at 95° C. The coated plastic lens was evaluated as in Example 1 with good results. There was no change in appearance after heating the lens for one hour at 140° C., and dipping it into boiling water for 2 hours.

EXAMPLE 3

In this experiment, 82.2 parts of γ-glycidoxypropyl-methyldiethoxysilane, 34.7 parts of vinyltriethoxysilane, and 21.8 parts of 0.05 N hydrochloric acid were placed in a reactor having a rotor, and stirred violently with a magnetic stirrer at 20° C. To this composition (Component A) was added 223 parts of "Methanol Silica Sol" (Component B), 117.5 parts of trimethylolpropane polyglycidylether (Component A), 7.2 parts of aluminum acetylacetonate (Component C), 25.6 parts of dichloroethane, 207.2 parts of trichloroethylene and 0.29 parts of silicon surfactant. The resulting mixture was mixed by stirring into a homogeneous coating composition. The solid content was 38%, viscosity was 4.9 centipoise at 20° C., and the water content based on the solvent was 3.1%.

The coating composition was then applied to a polymethylmethacrylate sheet produced by the casting method ("Sumipex", Sumitomo Chemical Industries, Co., Ltd.), by dipping the polymethylmethacrylate sheet into the coating composition and curing for 2 hours in an air drying oven at 93° C. The coated sheet was evaluated as in Example 1 and good results were obtained. Cracking of the coated film did not occur until the substrate was destroyed, and there was no change after heating to 150° C., and distorting the sheet by pressing it onto a mandrel having a diameter of 75 mm.

EXAMPLE 4

Part 1 - Preparation of Hydrolysates of γ-glycidoxypropylmethyldimethoxysilane Hydrolysates of γ-glycidoxypropylmethyldimethoxysilane were prepared by placing 220 parts of γ-glycidoxypropylmethyldimethoxysilane into a reactor having a rotor, stirring violently with a magnetic stirrer and immediately adding 36 parts of 0.01 N aqueous hydrochloric acid. After a few minutes, the solution became homogeneous and clear. The mixture was thereafter stirred for one hour and cooled to 5° C., in a refrigerator, with the hydrolysates resulting.

Part 2 - Preparation of the Coating Composition

The coating composition was prepared by mixing 100 parts of the hydrolysates (Component A) prepared in part 1, having a 68% solids content, 143.2 parts of an aqueous colloidal silica condensate ("Snowtex O", Nissan Chemical Industries, Ltd., Component B) having a pH of 3 to 4, containing 47.5% silica having a diameter of 15 mμ, 6.8 parts of aluminum bisethylacetoacetate acetylacetonate (Component C), and 28.8 parts of ethyl alcohol with stirring. The coating composition thus prepared had a water content, based on the solvent of 60%.

Part 3 - Coating and Curing

A lens material produced from a crosslinked acrylic polymer was washed with a nonionic surfactant and water, coated by dipping with the coating composition prepared in part 2 of this Example, and cured in an air drying oven for two minutes at 120° C. Soon after the curing process was completed, the coated lens was placed into a mold having a round and smooth surface, heated to 100° C., and pressed at 1000 kg/cm$^2$. The temperature of the mold was increased to 220° C., and maintained at this temperature for 5 minutes, and then cooled at a temperature of 50° C.

Part 4 - Evaluation

The lens prepared in part 3 of this Example was scratch-free after rubbing the lens with steel wool #0000. Transparency of the lens was good, and neither optical distortion nor any foreign substances could be seen in the film with the naked eye.

A dyeing bath was prepared from a disperse dye ("Sapphire Blue", Ciba Geigy A.G.), and the lens was tinted by dipping into the bath for 10 minutes at 80° C.

EXAMPLE 5

After applying a primer layer of an acrylic-ester copolymer to one side of a biaxially-oriented film of polyethyleneterephthalate ("Lumirror", Toray Industries, Inc.), 50μ in thickness, 3μ of coating composition (dry film thickness) was applied to the film by means of a roll coater and cured for one minute at 150° C.

The coating composition was prepared from a hydrolysate of 100 parts of γ-glycidoxypropyltrimethoxysilane hydrolyzed by 0.01 N aqueous hydrochloric acid, having a solid content of 58%, (Component A), 384 parts of aqueous colloidal silica dispersion ("Snowtex O", Nissan Chemical Industries, Ltd.), having a solid content of 20% (Component B), 58 parts of trimethylolpropane polyglycidylether (Component A), 8 parts of aluminum acetylacetonate (Component C), 0.32 parts of silicon surfactant, and 90 parts of a 2 to 1 mixture of isopropanol and n-butanol as solvent. The composition had a 72% water content based on the solvent. Smoothness and transparency of the coated film were good, and adhesion, scratch resistance against steel wool, hot water resistance, and chemical resistance were all satisfactory. When the coated film was curled around a cylinder having a diameter of 3 mm, its flexibility was excellent and no cracks were formed. Also, neither cracks nor degradations were found after an accelerated weatherability test utilizing a Sunshine-Weather-O-Meter for 200 hours. The frictional coefficient between two coated films as given by the ASTMD-1894 test was 0.20 in static friction and 0.15 in kinetic friction. The frictional coefficient between films like those above, but having no colloidal silica, was more than 8.

EXAMPLE 6

384 parts of a colloidal silica aqueous dispersion of pH 4, containing 20% of silica about 45 mμ in diameter, and 256 parts of "Methanol Silica Sol" having a solids content of 30%, were used as in Example 5. The coating composition had a 51% water content based on the solvent. The results obtained equalled those of Example 1.

EXAMPLE 7

Using a coating composition comprising the coating composition of Example 5 and 20 parts of hydrolysates of γ-glycidoxypropylmethyldiethoxysilane with aqueous hydrochloric acid, a coated film was prepared as in Example 5. Dyeing with a 0.5% aqueous solution of ("Sapphire Blue-4G", Ciba Geigy A.G.) for 10 minutes at 80° C. resulted in an insulated film with homogeneously tinted layers. There was no degradation in adhesion or in scratch resistance against the steel wool test.

EXAMPLE 8

351 parts of a γ-glycidoxypropylmethyldiethoxysilane was placed in a reactor having a rotor and 51 parts of 0.05 N aqueous hydrochloric acid was added, with the temperature being maintained at 10° C. Immediately thereafter, 328 parts of methyltrimethoxysilane were added and 130 parts of 0.01 N hydrochloric acid were added drop by drop (Component A). Then, 1814 parts of "Methanol Silica Sol" (Component B), 136 parts of sorbitol polyglycidylether (Component A), 108 parts of benzyl alcohol, 140 parts of phenylcellosolve and 21.2 parts of aluminum acetylacetonate (Component C), and 4.6 parts of silicon surfactant were added, and the resulting homogeneous coating composition had a solids content of 40.1%. The viscosity was 4.4 centipoise at 10° C., and the composition had a 9.2% water content based on the solvent (as determined by the Karl Fischer method for determination of water content). The coating composition was stable for one month at 10° C., without substantial change.

A plastic lens made from diethyleneglycolbisallyl carbonate and previously dipped in alkali was coated by dipping it into the coating composition and curing it in an air drying oven for 4 hours at 95° C. The resulting coated article was evaluated as in Example 1 and the results proved to be satisfactory.

EXAMPLE 9

The coating composition prepared as in Example 8 was applied to a sunglass lens produced from polymethylmethacrylate ("Acrypet VH", Mitsubishi Rayon Co., Ltd.), by injection molding. The coated lens was then cured for 2 hours at 97° C. The coated lens was evaluated as in Example 1, and the results were satisfactory. The tinted sunglass lens showed no change in appearance and adhesion after being subjected for 400 hours to an accelerated weatherability test with a Sunshine Weather-O-Meter.

EXAMPLE 10

31.5 parts of 0.05 N aqueous hydrochloric acid were added, drop by drop, to a mixture comprising 124 parts of γ-glycidoxypropylmethyldiethoxysilane and 47.5 parts of vinyltriethoxysilane (Component A). The resulting mixture was stirred for 30 minutes and thereafter 82.8 parts of "Methanol Silica Sol" (Component B), 303.3 parts of trichloroethylene, 0.42 parts of silicon surfactant, and 10.5 parts of aluminum acetylacetoacetonate (Component C) were added and mixed. The water content of the resulting coating composition was 3.5% based on the solvent (as determined by the Karl Fischer method).

After applying a primer layer of acrylonitrile-styrene copolymer onto the surface, a plastic sheet produced from poly(2,2-dihydroxyphenylpropane)carbonate ("Iupilon", Mitsubishi Gas Chemical Co., Inc.), was coated with the above coating composition by dipping, and thereafter cured in an air drying oven for 2 hours at 120° C. The coated sheet had a good appearance and was good in adhesion and showed excellent scratch resistance. There was no change in the appearance and adhesion of the coated sheet after it had been dipped in water for 13 hours at 80° C.

EXAMPLE 11

21.7 parts of 0.05 N aqueous hydrochloric acid were added to 149 parts of γ-glycidoxypropylmethyldiethoxysilane drop by drop at 10° C. Immediately thereafter, 42.5 parts of methyltrimethylsilane were added, and then 16.9 parts of 0.01 N hydrochloric acid were added drop by drop (Component A). Thereafter, 418.5 parts of "Methanol Silica Sol" (Component B) and 12.6 parts of aluminum acetylacetonate (Component C) were added while stirring. The resulting coating composition had a viscosity of 5.6 centipoise and a water content based on the solvent of 5.2%.

A cast plastic lens produced from diethyleneglycolbisallylcarbonate polymer and previously dipped in alkali was coated with the coating composition and cured in an air drying oven for 4 hours at 93° C. This coated plastic film was good in appearance, adhesion, scratch resistance and dyeability.

EXAMPLE 12

Part 1 - Preparation of Hydrolysates of γ-glycidoxypropyltrimethoxysilane

Preparation of hydrolysates of γ-glycidoxypropyltrimethoxysilane was carried out by adding, drop by drop, 24 parts of 0.05 N aqueous hydrochloric acid to a mixture of 212 parts of γ-glycidoxypropyltrimethoxysilane and 14 parts acetic acid. Then the solution of hydrolysates was set and aged in a refrigerator (Component A).

Part 2 - Preparation of the Coating Composition

The coating composition was prepared by adding 70 parts of epoxy resin ("Epikote 827", Shell Chemical Corp.) (Component A), 500 parts of "Methanol Silica Sol" (Component B), 60 parts of diacetonealcohol, 106 parts of n-butylalcohol, 0.2 parts of silicon surfactant, and 14 parts of aluminum acetylacetone (Component C) to a solution of the hydrolysates prepared in part 1 while stirring.

The coating composition thus prepared had a viscosity of 3.3 centipoise and a water content of 2.5% based on the solvent.

Part 3 - Coating and Evaluation

An injection molded plastic case produced from an acrylonitrile-styrene copolymer coated with the coating composition prepared in part 2 was thereafter cured in an air drying oven for 2 hours at 87° C. The coated substrate was excellent in appearance, adhesion, and scratch resistance. When compared with a non-coated substrate, the surface hardness of the coated substrate was excellent.

EXAMPLE 13

A coating composition was prepared as in Example 12, with diglycidylester of hexahydrophthalic acid being used instead of "Epikote 827". The coating composition was then applied to a plastic case produced from an acrylonitrilestyrene copolymer as in Example 12. The results were equal to those obtained in Example 12.

EXAMPLE 14

The coating composition was prepared by mixing 442.1 parts of hydrolysates of γ-glycidoxypropylmethyldiethoxysilane prepared in Example 1 (Component A), 155.4 parts of epoxy resin ("Epikote 827", Shell Chemical Corp.) (Component A), 223.8 parts of diacetonealcohol, 111.6 parts of benzylalcohol, 1423 parts of "Methanol Silica Sol" (Component B) 597.5 parts of methanol, 3.84 parts of silicon surfactant and 42.7 parts of aluminum acetylacetonate (Component C). The coating composition had a solid content of 31%, a viscosity of 3.4 centipoise at 10° C., and a water content of 4.1% based on the solvent as determined by the Near Infrared Spectrometry method.

The coating composition as prepared above was applied to a cast sunglass lens produced from a diethyleneglycolbisallylcarbonate polymer (CR-39). In this case, the lens should be previously dipped in alkali (about 5–30 weight % of alkaline, such as NaOH or KOH, in water) before the application of the coating composition. The coated lens was cured in an air drying oven for 4 hours at 93° C. The coated lens was evaluated as in Example 1 and good results were obtained. There were no crack or orange peel after the outdoor exposure for one month on 45°-inclined plane facing to the south of Miami, Fla., U.S.A. and Otsu, Japan.

EXAMPLE 15

145.4 parts of γ-chloropropyltrimethoxysilane were added to 265.1 parts of hydrolysates of γ-glydicoxypropylmethyldiethoxysilane prepared in Example 1, and then 48.3 parts of 0.01 N hydrochloric acid were added drop by drop.

To this composition (Component A) was added 121.9 parts of epoxy resin ("Epicron 750", Dainippon Ink and Chemicals, Inc.) (Component A), 197.3 parts of diacetonealcohol, 97.8 parts of benzylalcohol, 1354.3 parts of "Methanol Silica Sol" (Component B), 4.5 parts of silicon surfactant and 40.6 parts of aluminum acetylacetonate (Component C).

The composition had a 7.5% water content based on the solvent (as determined by the Near Infrared Spectrometry method for determination of water content). The coating composition was applied to CR-39 lens as in Example 14. The results obtained were equal to those of Example 14.

EXAMPLE 16

207.7 parts of γ-chloropropyltrimethoxysilane were added to 441.8 parts of hydrolysates of γ-glydidoxypropylmethyldiethoxysilane prepared in Example 1, and then 56.5 parts of 0.01 N hydrochloric acid were added drop by drop. To this composition (Component A) was added 1354.3 parts of "Methanol Silica Sol" (Component B), 103 parts of diethyleneglycoldimethylether, 791.6 parts of methanol, 4.5 parts of silicon surfactant and 40.6 parts of aluminum acetylacetonate (Component C). The coating composition had a solid content of 29%, a viscosity of 2.7 centipoise at 10° C. and a water content of 4.9% based on the solvent as determined by the Near Infrared Spectrometry method.

The coating composition was applied to CR-39 lens as in Example 14. The results obtained were the same as in Example 14.

EXAMPLE 17

83.1 parts of γ-glycidoxypropylmethyldiethoxysilane and 44.7 parts of phenyltrimethoxysilane were placed in a reactor having a rotor, and then 24.3 parts of 0.05 N hydrochloric acid were added drop by drop (Component A). Then, to this composition, 291.8 parts of "Methanol Silica Sol" (Component B), 46.6 parts of Methanol, 0.75 parts of silicon surfactant and 8.75 parts of aluminum acetylacetonate (Component C) were added.

The composition had an 11.4% water content based on the solvent (as determined by the Near Infrared Spectrometry method for determination of water content).

The coating composition was applied to CR-39 lens as in Example 14. The results obtained were the same as in Example 14.

EXAMPLE 18

The coating composition was prepared by mixing 52.4 parts of hydrolysates of γ-glycidoxypropylmethyldiethoxysilane and phenyltrimethoxysilane prepared in Example 17 (Component A) with 8.6 parts of epoxy resin ("Epicron 750") (Component A), 19 parts of diacetonealcohol, 9.5 parts of benzylalcohol, 2.7 parts of methanol, 128.8 parts of "Methanol Silica Sol" (Component B), 0.33 parts of silicon surfactant and 3.85 parts of aluminum acetylacetonate (Component C).

The composition had an 8.9% water content based on the solvent (as determined by the Near Infrared Spectrometry method for determination of water content).

The coating composition was applied to CR-39 lens as in Example 14. The results obtained were the same as those in Example 14.

EXAMPLE 19

A coating composition was prepared as in Example 18 with "Epicron 830" (Bisphenol F type epoxy, Dainippon Ink and Chemicals, Inc.) (Component A) being used as epoxy resin instead of "Epicron 750". The composition had an 8.9% water content based on the solvent. The coating composition was applied to CR-39 lens as in Example 14. The results obtained were the same as those in Example 14.

EXAMPLE 20

The coating composition was prepared by mixing 366.6 parts of hydrolysates of γ-glycidoxypropylmethyldiethoxysilane prepared in Example 1 (Component A), 80.7 parts of epoxy resin (Epikote 826, Shell Chemical Corp.), 49.0 parts of epoxy resin ("Epikote 834", Shell Chemical Corp.) (Component A), 61.4 parts of trimethylolpropane polyglycidylether (Component A), 1955.8 parts of "Methanol Silica Sol" (Component B), 302.5 parts of diacetonealcohol, 126 parts of benzylalcohol, 4.5 parts of silicon surfactant and 100.3 parts of aluminum acetylacetonate (Component C).

The composition had a 2.3% water content based on the solvent (as determined by the Near Infrared Spectrometry method for determination of water content). A plastic lens produced from poly(2,2-di(p-hydroxyphenyl) propane) carbonate ("LEXAN-141", General Electric Co.) was coated with the above coating composition by dipping, and thereafter cured in an air drying oven for 2 hours at 130° C. The coated lens had a good appearance and was good in adhesion and showed excellent scratch resistance.

The coated lens was dipped into the dyeing bath for 30 minutes at 90° C., and was densely colored. There were no changes after the outdoor exposure for one month as in Example 14.

COMPARATIVE EXAMPLE 1

Ethylsilicate was used as the source of silica instead of "Methanol Silica Sol" of Example 1. To 208 parts of ethylsilicate having a silica content of 21.4%, 72 parts 0.05 N aqueous hydrochloric acid were added. Hydrolysates of ethylsilicate were used in the place of "Methanol Silica Sol", and a film was prepared as described in Example 1. The scratch resistance and appearance of the film were good but adhesion to the substrate was poor and the article was not tintable.

COMPARATIVE EXAMPLE 2

100 parts of the coating composition of Example 8 were treated with "Zeolum A-3" (Toyo Soda Mfg. Co., Ltd.) at 10° C., for removal of water. The water content was diminished to 0.8% based on the solvent.

The coated film was prepared by the method described in Example 1 and then evaluated. This film showed poor scratch resistance as exemplified by pronounced scratching of the surface during the steel wool test. The viscosity of the coating composition increased from 6.9 centipoise to 7.9 centipoise at 10° C., within one week.

Compared with Example 1, the coating composition became unstable upon removal from water.

COMPARATIVE EXAMPLE 3

A coating composition, prepared as in Example 8, but having no silica sol, was used in the coating composition and evaluated as in Example 9. A substrate, coated with the composition, had a good appearance, good adhesion and dyeability, but was poor in scratch resistance as exemplified by the steel wool test. When compared with Example 9, it is apparent that the silica sol of Example 9 has the effect of increasing scratch resistance, but not decreasing dyeability and transparency.

We claim:

1. A coating composition comprising components A, B, C and D wherein

Component A is:

A hydrolysate of a silane compound containing an epoxy group and not less than two alkoxy groups which are directly bonded to an Si atom in the molecule;

Component B comprises fine particles of silica which particles have an average diameter of about 1 to 100 mµ, and wherein Component C comprises an aluminum chelate compound having the formula $AlX_nY_{3-n}$ wherein X is OL (wherein L is a lower alkyl group), Y is at least one ligand produced from the group consisting of:

(1) $M'COCH_2COM^2$ and (2) $M^3COCH_2COOM^4$ wherein (M', $M^2$, $M^3$ and $M^4$ are lower alkyl groups) and n is 0, 1 or 2, and wherein Component D comprises a solvent comprising more than about 1 weight percent water, the amount of Component B being about 1 to 500 parts by weight per 100 parts by weight of Component A, and the amount of Component C being about 0.01 to 50 parts by weight per 100 parts by weight of Component A.

2. A coating composition comprising components A, B, C and D wherein

Component A comprises (1) A hydrolysate of a silane compound containing an epoxy group and not less than two alkoxy groups which are directly bonded to an Si atom in the molecule, and (2) at least one compound selected from the group consisting of:

(2.1) A compound containing a silanol and/or siloxane group in the molecule and (2.2) an epoxy compound, and wherein Component B comprises fine particles of silica which particles have an average diameter of about 1 to 100 mµ, and wherein Component C comprises an aluminum chelate compound having the formula $AlX_nY_{3-n}$ wherein X is OL (wherein L is a lower alkyl group), Y is at least one ligand produced from the group consisting of:

(1) $M'COCH_2COM^2$ and (2) $M^3COCH_2COOM^4$ wherein M', $M^2$, $M^3$ and $M^4$ are lower alkyl groups and n is 0, 1 or 2, and wherein Component D comprises a solvent comprising more than about 1 weight percent water, the amount of Component B being about 1 to 500 parts by weight of Component A, the amount of Component C being about 0.01 to 50 parts by weight per 100 parts by weight of Component A, the calculated weight percent of (1) in Component A in film being more than about 10, and the calculated weight percent of the sum of (1) and (2.2) in Component A in film being more than about 30.

3. A coating composition as recited in claim 1 or claim 2 wherein said compound described in (1) in Component A comprises a compound having the general formula

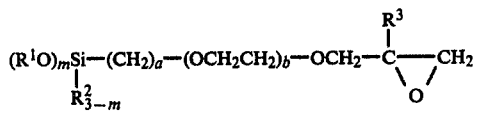

wherein $R^1$ is an alkyl or alkoxyalkyl group having 1 to 4 carbon atoms, $R^2$ is an alkyl or aryl group having 1 to 6 carbon atoms, $R^3$ is hydrogen or a methyl group, m is 2 or 3, a is an integer from 1 to 6, and b is 0, 1 or 2.

4. A coating composition as recited in claim 2, wherein said compound described in (2.1) in Component A comprises a hydrolysate of a compound having the general formula,

wherein $R^4$ and $R^5$ are members selected from the group consisting of substituted or non-substituted alkyl, alkenyl and aryl, Z is an alkoxyl, alkoxyalkoxyl or acyloxy group, c and d are 0, 1 or 2, respectively, and c+d is 0, 1 or 2.

5. A coating composition as recited in claim 4, wherein each of c and d is 0 or 1, and c+d is 0 or 1.

6. A coating composition as recited in claim 2, wherein said compound described in (2.2) in Component A comprises a compound having not less than two epoxy groups in the molecule.

7. A coating composition as recited in claim 2, wherein said compound described in (2.2) in Component A is a member selected from the group consisting of polyglycidyl ethers and polyglycidyl esters.

8. An article having a hard film, which film is formed by heating and curing a coating composition that is overlayed on the article, wherein said coating composition comprises the coating composition recited in claim 1 or claim 2.

9. An article as claimed in claim 8, wherein said article comprises a plastic substrate.

10. An article as recited in claim 9, wherein said plastic substrate comprises an acrylic polymer.

11. An article as recited in claim 9, wherein said plastic substrate comprises poly(2,2-dihydroxyphenyl propane) carbonate.

12. An article as recited in claim 9, wherein said plastic substrate comprises diethyleneglycolbisallylcarbonate polymer.

13. An article of claim 12, wherein said plastic substrate is previously dipped in alkali before the application of the coating composition.

14. An article as recited in claim 9, wherein said plastic substrate comprises polyester.

15. An article as recited in claim 9, wherein said plastic substrate comprises an acrylonitrile-styrene copolymer.

16. The coating composition of claim 1 or claim 2, wherein the amount of Component B is about 10 to 200 parts by weight per 100 parts by weight of Component A.

17. The coating composition of claim 1 or claim 2, wherein the amount of Component C is about 0.05 to 10 parts by weight per 100 parts by weight of Component A.

18. The coating composition of claim 1, wherein said compound (2) is phenyltrimethoxysilane.

19. The coating composition of claim 1, wherein said compound (2) is γ-chloropropyltrimethoxysilane.

* * * * *